United States Patent
Lin et al.

(10) Patent No.: US 7,230,801 B2
(45) Date of Patent: Jun. 12, 2007

(54) GIANT MAGNETORESISTANCE (GMR) READ HEAD WITH REACTIVE-ION-ETCH DEFINED READ WIDTH AND FABRICATION PROCESS

(75) Inventors: Tsann Lin, Saratoga, CA (US); Daniele Mauri, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 10/925,834

(22) Filed: Aug. 24, 2004

(65) Prior Publication Data

US 2005/0024789 A1    Feb. 3, 2005

Related U.S. Application Data

(62) Division of application No. 10/118,407, filed on Apr. 5, 2002, now Pat. No. 6,989,971.

(51) Int. Cl.
    *G11B 5/39*     (2006.01)
(52) U.S. Cl. .................... 360/322; 360/324.12
(58) Field of Classification Search ............. 360/322, 360/324, 324.1, 324.11, 324.12, 324.2
See application file for complete search history.

(56) References Cited

U.S. PATENT DOCUMENTS

| | | | |
|---|---|---|---|
| 5,302,469 A | 4/1994 | Sugenoya et al. | ....... 428/694 T |
| 5,329,413 A | 7/1994 | Kondoh et al. | ............. 360/113 |
| 5,466,539 A | 11/1995 | Takayama | ................ 428/611 |
| 5,473,492 A | 12/1995 | Terunuma et al. | .......... 360/128 |
| 5,508,866 A | 4/1996 | Gill et al. | ................... 360/113 |
| 5,508,867 A * | 4/1996 | Cain et al. | ............. 360/324.11 |
| 5,552,949 A | 9/1996 | Hashimoto et al. | ......... 360/113 |
| 5,637,235 A | 6/1997 | Kim et al. | ..................... 216/22 |

(Continued)

FOREIGN PATENT DOCUMENTS

JP      06195643 A     7/1994

(Continued)

OTHER PUBLICATIONS

IBM Technical Disclosure Bulletin, vol. 39, No. 04 Apr. 1996, "Continuous Spacer Spin Valve Structure" by R.E. Fontana, Jr., B.A. Gurney, T. Lin, V.S. Speriosu and C. Tsang, pp. 147-149.

*Primary Examiner*—Craig A. Renner
(74) *Attorney, Agent, or Firm*—Robert O. Guillot; Intellectual Property Law Offices (57) ABSTRACT

The GMR read head includes a GMR read sensor and a longitudinal bias (LB) stack in a read region, and the GMR read sensor, the LB stack and a first conductor layer in two overlay regions. In its fabrication process, the GMR read sensor, the LB stack and the first conductor layer are sequentially deposited on a bottom gap layer. A monolayer photoresist is deposited, exposed and developed in order to open a read trench region for the definition of a read width, and RIE is then applied to remove the first conductor layer in the read trench region. After liftoff of the monolayer photoresist, bilayer photoresists are deposited, exposed and developed in order to mask the read and overlay regions, and a second conductor layer is deposited in two unmasked side regions. As a result, side reading is eliminated and a read width is sharply defined by RIE.

8 Claims, 4 Drawing Sheets

U.S. PATENT DOCUMENTS

| | | | |
|---|---|---|---|
| 5,729,411 A | 3/1998 | Kishi et al. | 360/113 |
| 5,742,162 A * | 4/1998 | Nepela et al. | 324/252 |
| 5,768,067 A | 6/1998 | Saito et al. | 360/113 |
| 5,936,810 A | 8/1999 | Nakamoto et al. | 360/322 |
| 5,946,167 A | 8/1999 | Hara et al. | 360/322 |
| 5,949,623 A | 9/1999 | Lin | 360/113 |
| 6,030,753 A | 2/2000 | Lin | 430/314 |
| 6,327,107 B1 | 12/2001 | Komuro et al. | 360/324.2 |
| 6,344,953 B1 | 2/2002 | Kautzky et al. | 360/322 |
| 6,430,014 B1 * | 8/2002 | Gill | 360/324.12 |
| 6,473,279 B2 * | 10/2002 | Smith et al. | 360/324.12 |
| 6,556,392 B1 * | 4/2003 | Mao et al. | 360/324.12 |
| 6,570,745 B1 | 5/2003 | Gill | 360/322 |
| 6,636,397 B2 | 10/2003 | Gill | 360/324.12 |
| 6,671,139 B2 * | 12/2003 | Carey et al. | 360/324.12 |
| 6,819,533 B2 * | 11/2004 | Noma et al. | 360/324.12 |
| 6,856,493 B2 * | 2/2005 | Pinarbasi | 360/324.11 |
| 6,857,180 B2 * | 2/2005 | Horng et al. | 360/324.12 |
| 6,937,449 B2 * | 8/2005 | Hoshiya et al. | 360/324.12 |
| 7,010,848 B2 * | 3/2006 | Li et al. | 360/324.12 |
| 7,099,125 B2 * | 8/2006 | Li et al. | 360/324.12 |
| 2001/0012188 A1 * | 8/2001 | Hasegawa et al. | 360/324.12 |
| 2003/0011943 A1 | 1/2003 | Webb et al. | 360/322 |
| 2003/0179507 A1 | 9/2003 | Freitag et al. | 360/322 |
| 2003/0179509 A1 | 9/2003 | Pinarbasi | 360/322 |
| 2003/0179515 A1 | 9/2003 | Pinarbasi | 360/324.12 |

FOREIGN PATENT DOCUMENTS

| | | |
|---|---|---|
| JP | 06316748 A | 11/1994 |
| JP | 10172119 A | 6/1998 |
| JP | 11134617 A | 5/1999 |

* cited by examiner

GIANT MAGNETORESISTANCE (GMR) READ HEAD WITH REACTIVE-ION-ETCH DEFINED READ WIDTH AND FABRICATION PROCESS

CROSS REFERENCE TO RELATED APPLICATION

This application is a divisional application of U.S. patent application Ser. No. 10/118,407 filed Apr. 5, 2002 now U.S. Pat. No. 6,989,971.

BACKGROUND OF THE INVENTION

1. Field of the Invention

The present invention relates generally to read head portions of magnetic heads for hard disk drives, and more particularly to read heads having a reactive ion etch (RIE) defined read width.

2. Description of the Prior Art

One well known way to improve the performance of hard disk drives is to increase the areal data storage density of the magnetic hard disk. This can be accomplished by reducing a written data track width, such that more tracks per inch can be written on the disk. To read data from a disk with the reduced track width, it is also necessary to develop a sufficiently narrow read head having a narrow read width, such that unwanted magnetic field interference from adjacent data tracks is substantially eliminated.

Figure 3:
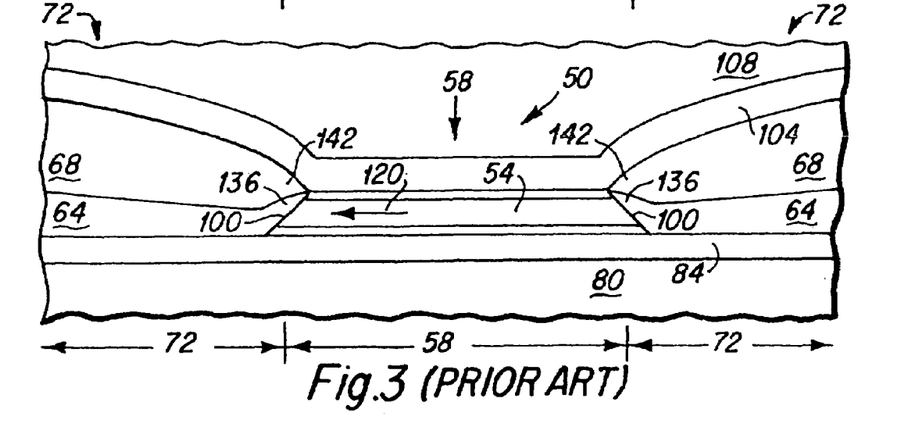

The standard prior art read head includes a plurality of thin films that are deposited and fabricated to produce a giant magnetoresistance (GMR) read head, as is known to those skilled in the art. In a commonly used GMR read head, as shown in FIG. 3 and described in detail herebelow, a GMR read sensor is located in a read region, while a longitudinal bias (LB) stack and a conductor are located in each of two side regions. The GMR read sensor typically comprises $Al_2O_3$/NiCrFe/NiFe seed layers, an antiferromagnetic PtMn transverse pinning layer, a ferromagnetic CoFe keeper layer, a nonmagnetic Ru spacer layer, a ferromagnetic CoFe reference layer, a nonmagnetic CuO spacer layer, a ferromagnetic CoFe sense layer, and nonmagnetic Cu/Ta cap layers. The LB stack used for hard-magnetic stabilization of the GMR read sensor typically comprises a nonmagnetic Cr film and a hard-magnetic CoPtCr film. Alternatively, the LB stack used for antiferromagnetic stabilization of the GMR sensor may typically comprise a ferromagnetic CoFe film and an antiferromagnetic Ir—Mn film. The conductor typically comprises nonmagnetic Ta/Rh/Ta films.

In the typical fabrication process of the prior art GMR read head, the GMR read sensor is deposited, and bilayer photoresists are then applied and exposed to mask the GMR read sensor in a read region for defining a read sensor width. The unmasked GMR sensor in side regions is removed by ion milling. The LB stack is then deposited at the sensor edges in the unmasked side regions, and the bilayer photoresists are subsequently removed. Due to shadowing effects of the bilayer photoresists it is difficult to achieve a designed read width, and sensor instability often results. This is because both the GMR read sensor and the LB stack are tapered and abutted with each other at the sensor edge, and due to the shadowing effects, the boundary between the read region and the side regions is ambiguous, so that the designed read width cannot easily be attained.

In the present invention, the read width is defined by RIE before the bilayer photoresist is applied. As a result, the read width is accurately defined and improved device performance results.

SUMMARY OF THE INVENTION

The present invention is an improved magnetic head for a hard disk drive including a giant magnetoresistance (GMR) read head with a reactive-ion-etch (RIE) defined read width, and its fabrication process. The GMR read head comprises a GMR read sensor and a longitudinal bias (LB) stack in a read region, and comprises the GMR read sensor, the LB stack and a first conductor in two overlay regions. In its fabrication process, the GMR read sensor, the LB stack and the first conductor are sequentially deposited on a bottom gap layer. A monolayer photoresist is applied and developed in order to open a read region for the definition of a read width, and RIE is then applied to remove the first conductor in the read region. After liftoff of the monolayer photoresist, bilayer photoresists are applied and developed in order to mask the read and overlay regions, and a second conductor is deposited in two unmasked side regions. The GMR read sensor in the read region is active since its sense-layer magnetization is oriented in a longitudinal direction by three counter-balancing fields, and can be rotated in responses to signal fields. The GMR read sensor in the two overlay regions is inactive since its sense-layer magnetization is oriented in a transverse direction by a high current-induced field, and cannot be rotated in responses to signal fields. As a result, side reading is eliminated and a read width is sharply defined by the boundaries between the read and overlay regions.

It is an advantage of the magnetic head of the present invention that a read head has been developed with reduced side reading problems.

It is another advantage of the magnetic head of the present invention that a read head has been developed having a read width that is defined by a reactive ion etch (RIE).

It is an advantage of the hard disk drive of the present invention that it includes a magnetic head having a reduced read track width with reduced side reading problems.

It is another advantage of the hard disk drive of the present invention that it includes a magnetic head having a read width that is defined by a reactive ion etch (RIE).

These and other features and advantages of the present invention will no doubt become apparent to those skilled in the art upon reading the following detailed description which makes reference to the several figures of the drawings.

DETAILED DESCRIPTION OF THE PREFERRED EMBODIMENTS

Figure 1:
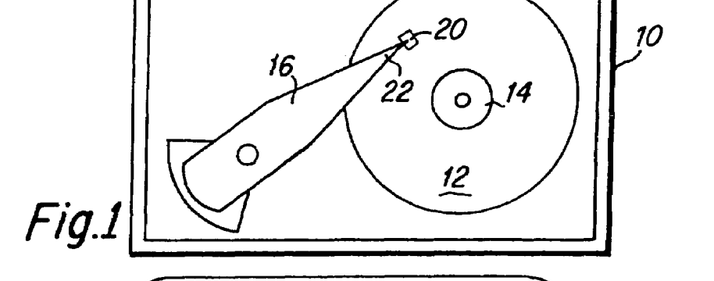
FIG. 1 is a top plan view depicting a hard disk drive having a magnetic head of the present invention.

FIG. 1 is a top plan view that depicts significant components of a hard disk drive which includes the magnetic head of the present invention. The hard disk drive 10 includes a magnetic hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a plurality of magnetic heads 20 mounted upon the distal ends 22 of the plurality of the actuator arms 16. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which various layers and structures that form the magnetic head are fabricated. Such heads are fabricated in large quantities upon a wafer substrate and subsequently sliced into discrete magnetic heads 20.

One way to increase the areal data storage density of a hard disk 12 is to narrow the track width of the data tracks written on the hard disk, such that more tracks per inch can be written on the disk. To write data in narrower tracks it is first necessary to develop the write head components of magnetic heads 20 with a narrower written track width. Correspondingly, it is also necessary to develop read head components of such magnetic heads 20 having narrowed active read widths, such that side reading from adjacent data tracks is minimized.

Figure 2:
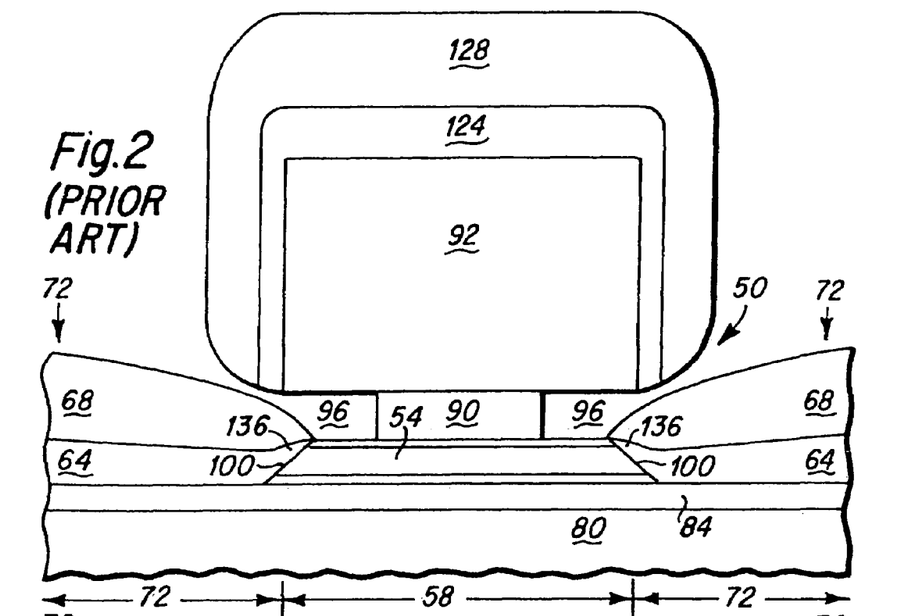
FIGS. 2 and 3 are side cross-sectional views of a prior art read head portion of a magnetic head.

In an extensively used prior art GMR read head, as shown in FIGS. 2 and 3, a GMR read head 50 includes a GMR read sensor 54, comprising a plurality of films such as $Al_2O_3(3)$/NiCrFe(3)/NiFe(1)/PtMn(15)/CoFe(1.6)/Ru(0.8)/CoFe(1.8)/CuO(2.2)/CoFe(2)/Cu(0.6)/Ta(6) films (thickness in nm) in a read region 58, a longitudinal bias (LB) stack 64, comprising a plurality of films such as Cr(3)/CoPtCr(40) films disposed in two side regions 72, and an electrical conductor 68 comprising a plurality of films such as Ta(3)/Rh(80)/Ta(3) films, also in the two side regions 72. In a head fabrication process, a bottom shield layer ($S_1$) 80 is fabricated upon a wafer substrate. An insulating bottom gap layer ($G_1$) 84 and the GMR read sensor 54 are sequentially deposited on the $S_1$ 80. The wafer is then annealed in a 10 kOe magnetic field perpendicular to an alignment mark for 5 hours at 265° C. As is depicted in FIG. 2, bilayer photoresists 90 and 92 are then deposited and exposed in a photolithographic tool to mask the GMR read sensor 54 in the read region 58 for defining a read sensor width, and subsequently developed in a solvent to form undercuts 96. The unmasked plurality of films of the GMR sensor 54 in the two side regions 72 are removed by ion milling until the bottom gap layer 84 is exposed. The LB stack 64 and the conductor 68 are then sequentially deposited at sensor edges 100 in the unmasked side regions 72. The bilayer photoresists 90 and 92 are then lifted off. Subsequently, the GMR read sensor 54 is patterned for defining a sensor height, connected with another conductor (not shown) covered by an insulating top gap layer ($G_2$) 104 and a top magnetic shield layer ($S_2$) 108. After the completion of this read head fabrication process, the write head fabrication process starts as is well known to those skilled in the art. After the completion of the read/write head fabrication process, the read/write head is lapped along the alignment mark until designed sensor height and throat height are attained.

To ensure good electrical and magnetic contacts of the GMR read sensor 54 with the LB stack 64 and the conductor 68, ion milling of the GMR read sensor 54 is typically applied by tilting an ion beam gun by 10° from a normal line for the formation of two short sensor edges 100, and the depositions of the LB stack 64 and the conductor 68 are conducted by tilting an ion beam gun by 20° from the normal line for good coverage over the sensor edges 100. The two short sensor edges 100 are needed to prevent unwanted domain instability, while the good coverage is needed to ensure enough CoPtCr film thickness at the sensor edges 100 and to ensure a steady electrical flow without an electrostatic discharge.

To ensure proper sensor operation, the magnetization of the CoFe keeper layer ($M_3$) of the GMR read sensor 54 must be rigidly pinned through anti-ferromagnetic/ferromagnetic parallel exchange coupling to its adjacent PtMn transverse pinning layer in a transverse direction (into the page) perpendicular to and away from an air bearing surface (ABS), while the magnetization of the CoFe reference layer ($M_2$) of the GMR read sensor 54 must be also rigidly pinned through antiparallel exchange coupling across the Ru spacer layer of the GMR read sensor 54 in another direction perpendicular to but towards the ABS (out of the page).

As is known to those skilled in the art to ensure optimal biasing of GMR responses, the magnetization of the CoFe sense layer ($M_1$) of the GMR read sensor 54 must be oriented in a longitudinal direction (see arrow 120) parallel to the ABS. This orientation is achieved due to a balance of three magnetic fields, one a ferromagnetic coupling field ($H_F$) between the CoFe reference layer and the CoFe sense layer, one a demagnetizing field ($H_D$) and the other a current-induced field ($H_I$).

After rigidly pinning $M_3$ in the transverse direction perpendicular to and away from the ABS (into the page), rigidly pinning $M_2$ in the another direction perpendicular to but towards the ABS (out of the page), and orienting $M_1$ in the longitudinal direction 120 parallel to the ABS with an optimal sense current, the GMR read sensor exhibits a resistance of $R_H+(\frac{1}{2})\Delta R_G$, where $R_H$ is a resistance measured when $M_1$, $M_2$ and $M_3$ are parallel to each other, and $\Delta R_G$ is the maximum giant magnetoresistance (GMR) measured when $M_1$ is antiparallel to $M_2$. During sensor operation, $M_1$ rotates in response to signal fields while $M_2$ and $M_3$ remain unchanged. This $M_1$ rotation causes a change in the resistance of the GMR read sensor by $-\Delta R_G \sin\theta_1 - \Delta R_A \sin^2\theta_1$, where $\theta_1$ is an $M_1$ rotation angle and $\Delta R_A$ is the maximum anisotropy magnetoresistance (AMR) of the sense layer. Both $R_H$ and $\Delta R_G$ must be high enough to ensure high signal amplitudes, while $\Delta R_A$ must be low enough to ensure signal linearity.

To attain stable GMR responses, the LB stack 64 located in the two side regions 72 must exhibit a magnetization ($M_4$) oriented in the longitudinal direction 120 parallel to the ABS. The ratio of $M_4$ to $M_1$ is preferably higher than one in order to produce a sufficiently high longitudinal bias field in the sense layer. To suppress multidomain activities at sensor edges 100, the Cr/CoPtCr films used for hard-magnetic ($H_M$) stabilization must exhibit a high coercivity ($H_C$), while the CoFe/IrMn films used for antiferromagnetic (AFM) stabilization must exhibit a high unidirectional anisotropy field ($H_{UA}$).

Due to shadowing effects of the top photoresist 92 with overhangs 124 and 128 formed during the depositions of the LB stack 64 and the conductor 68 respectively, it is difficult to achieve sensor stability and attain a designed read width. The sensor stability cannot be easily achieved since a CoPtCr "taper" 136 is formed at the sensor edge 100 due to shadowing effects, and this taper 136 is much thinner than the CoPtCr film in the unmasked side region 72. To attain a magnetic moment comparable to $M_1$ at the sensor edge 100, the CoPtCr film in the unmasked side regions 72 must be thick enough to exhibit a magnetic moment of as high as more than six times of $M_1$. Consequently, when the sensor stability is achieved, signal sensitivity and read efficiency are substantially decreased. The designed read width cannot be easily attained since a boundary between the read and side regions cannot be unambiguously defined. Three approaches to defining this boundary, one physically by the top photoresist width, one magnetically by the LB stack, and the other electrically by the conductor, lead to three different read widths. The physical boundary definition typically used for process controls cannot be well correlated with the read width. The magnetic boundary definition is most correlated with the read width, but is difficult to locate due to complicated magnetics at the contiguous junction between the sensor edge 100 and the CoPtCr taper 136. The electrical boundary definition is closely correlated with the read width, but is difficult to locate due to non-uniform current shunting into a conductor "taper" 142 formed above the GMR read sensor due to the shadowing effects.

An alternative prior art LB stack may comprise CoFe(3)/IrMn(15) films. The read head fabrication process is basically identical to that previously described, except that after the deposition of the insulating top gap layer 104, the wafer is annealed in a 200 Oe magnetic field parallel to the alignment mark for 1 hour at 240° C. The anneal causes the IrMn film to pin the magnetization of its underlying CoFe film in a direction parallel to the alignment mark. To ensure good electrical and magnetic contacts of the GMR read sensor 54 with the LB stack 64 and the conductor 68, ion milling of the GMR read sensor 54 is typically applied by tilting an ion beam gun by 30° from a normal line for the formation of two long sensor edges 100, and the depositions of the LB stack 64 and the conductor 68 are conducted by tilting an ion beam gun by 20° from the normal line for good coverage over the sensor edges. Long sensor edges are obtained, and they are needed to ensure strong exchange coupling at a long enough interface between the sensor edges and the CoFe/IrMn films, while good coverage is needed to ensure enough CoFe and IrMn film thicknesses at the sensor edges, and to ensure a steady electrical flow without an electrostatic discharge.

Due to shadowing effects of the top photoresist 92 with overhangs 124 and 128 formed during the depositions of the LB stack 64 and the conductor 68 respectively, it is also difficult to achieve sensor stability and attain a designed read width. In addition, due to the shadowing effects, the IrMn film at the contiguous junction may be thinner than its critical thickness (approximately 6 nm), so that $H_{UA}$ becomes almost zero at the contiguous junction. Currently, these GMR read heads are being used for magnetic recording at approximately 20 Gb/in². While they exhibit good read performance, concerns about the sensor stability and the read width definition still remain. Therefore, to perform magnetic recording at ever increasing recording densities, the shadowing effects caused by the use of top photoresist 92 must be minimized.

Figure 5:
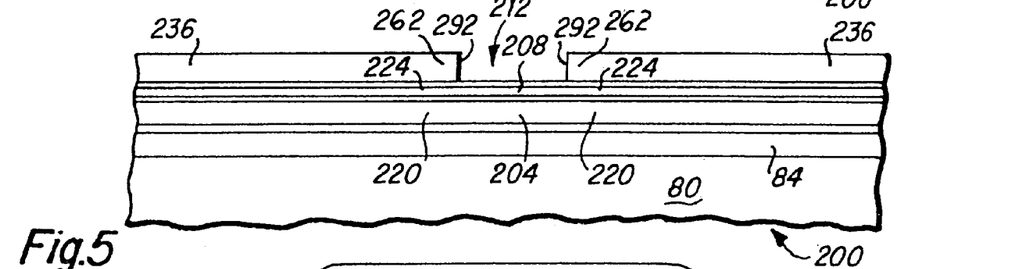
Figure 6:
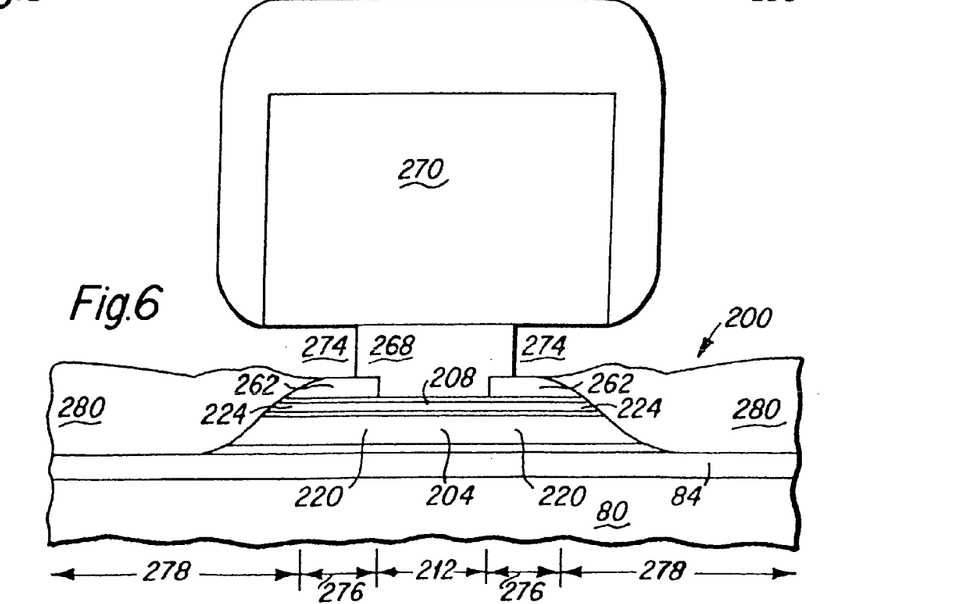
Figure 7:
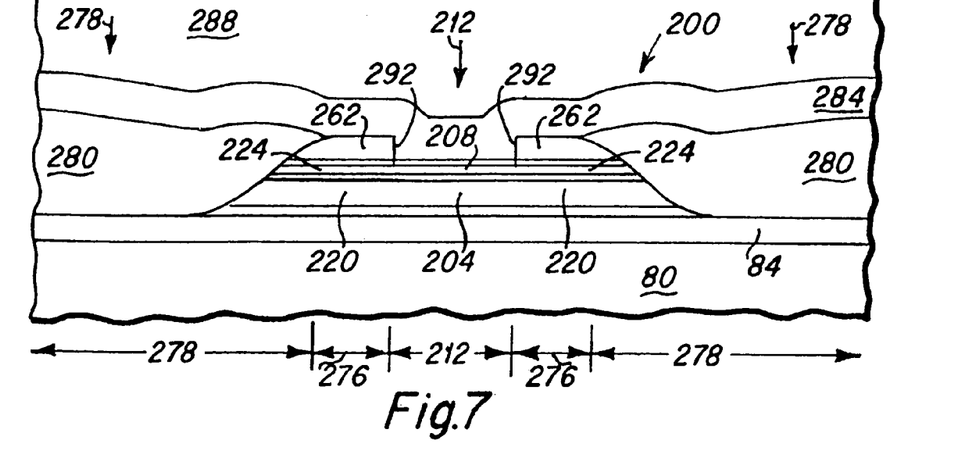

As depicted in FIGS. 4–7, and particularly FIG. 7, a first embodiment of the GMR read head 200 of the present invention includes a GMR read sensor 204 and a LB stack 208 in a read region 212, outer portions 220 of the GMR read sensor, outer portions 224 of the LB stack and two spaced apart portions 262 of a first conductor layer 236 disposed in two sideways displaced overlay regions 276, and also includes a second conductor layer 280 disposed in two side regions 278. Particularly, the GMR read sensor 204 may include Al$_2$O$_3$(3)/NiCrFe(3)/NiFe(1)/PtMn(15)/CoFe(1.6)/Ru(0.8)/CoFe(1.8)/CuO(2.2)/CoFe(2)/Cu(0.6)/Ru(2.4) films, the LB stack 208 may include CoFe(3)/IrMn(6)/Ru(3) layers, and the first conductor layer 236 may be formed of a Ta(20) film. In the head fabrication process, a bottom shield layer 80 is fabricated upon a wafer substrate. An insulating bottom gap layer (G$_1$) 84, the GMR read sensor 204, the LB stack 208, and the first conductor layer 236 are all sequentially deposited on a wafer. After the depositions, the wafer is annealed in a magnetic field of 10 kOe perpendicular to the alignment mark for 5 hours at 265° C., and then annealed again in a magnetic field of 200 Oe parallel to the alignment mark for 1 hour at 240° C. The two anneals cause the PtMn films to pin the magnetizations of the CoFe/Ru/CoFe films in a direction perpendicular to the alignment mark, and cause the IrMn film to pin the magnetization of its underlying CoFe film in a direction parallel to the alignment mark.

Figure 4:
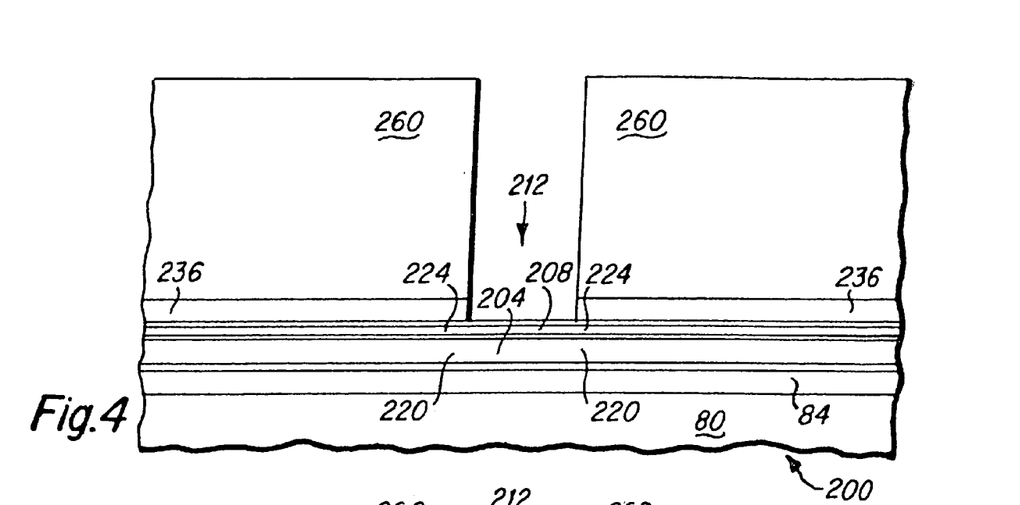
FIGS. 4–7 are side cross-sectional views of a first preferred embodiment of a read head portion of a magnetic head of the present invention.

After these two anneals, as is depicted in FIG. 4, a monolayer photoresist 260 is deposited and exposed in a photolithographic tool, and then developed in order to open a read trench region 212 for the definition of a read width. Reactive ion etch (RIE) is then performed to remove a central portion of the first conductor layer 236 in the read trench region 212 to leave two spaced apart conductor portions 262. After liftoff of the monolayer photoresist 260, as shown in FIG. 5, bilayer photoresists 268 and 270 depicted in FIG. 6 are deposited and exposed in the photolithographic tool to mask the read and overlay regions, and the wafer is then developed in a solvent to form undercuts 274. The multilayer films in the unmasked side region 278 are then removed by ion milling until the insulating bottom gap layer 84 is exposed, and a second conductor 280 which may include Ta(3)/Rh(80)/Ta(3) films is then deposited in the unmasked side regions 278. After this deposition, the bilayer photoresists 268 and 270 are lifted off and the read head fabrication process continues in well known steps to fabricate an insulating top gap layer 284 and a top magnetic shield layer 288, as is depicted in FIG. 7. After the completion of this read head fabrication process, the well known write head fabrication process is commenced. After the completion of the read/write head fabrication process, the sensor height is defined by lapping along the alignment mark.

Due to the use of the LB stack 208 in the read region 212, it becomes easier to achieve sensor stability without decreasing signal sensitivity and read efficiency. That is, due to the use of the monolayer photoresist 260 and RIE, it becomes easier to attain a designed read width 212 without concerns about side reading. Particularly, the RIE of the first conductor layer 236 creates the two spaced apart portions 262 of the first conductor layer 236, each having a sharply defined opposing face 292 that serves to help define the read width 212 of the GMR read head 200. As is seen in FIG. 7, each face 292 is RIE, to be generally perpendicular to the film surface 224. The sensor stability can be easily achieved due to magnetostatic interactions between $M_1$ and $M_4$, which form a flux closure after the GMR read head is RIE, for the definition of the sensor width 212. A high signal sensitivity can be maintained because $M_4$ only needs to be 1.5 times $M_1$ for sensor stability, instead of more than 6 times $M_1$ when Cr/CoPtCr films are used for the HM stabilization. A high read efficiency can be maintained because stray fields, which stem from the CoPtCr film used for the HM stabilization, do not exist at the sensor edges. As a result, stray-field induced sensor stiffness at the sensor edges is substantially reduced. The designed read width 212 can be substantially unambiguously attained since three factors for defining the boundary between the read and overlay regions, one physically by the monolayer photoresist width, one magnetically by the LB stack, and the third electrically by the first conductor, all lead to a substantially identical read width 212. Side reading is substantially eliminated since the GMR read sensor is only active in the read region 212.

The first conductor layers 236 overlying the GMR read sensor 220 and the LB stack 224 in the overlay regions 276 play a significant role in defining the boundary between the read and overlay regions. This first conductor layer 236 must be highly conductive and RIEable. A RIEable Ta film can be used as the first conductor layer, but it must be deposited upon a suitable seed layer such as a Ru Cr, W or $TN_x$ film in order to exhibit a low-resistivity (40 $\mu\Omega$-cm) $\alpha$ phase, instead of a high-resistivity (180 $\mu\Omega$-cm) $\beta$ phase. Alternatively, RIEable W and Mo films (exhibiting resistivities of 15 and 17 $\mu\Omega$-cm, respectively) can also be used as the first conductor layer. The use of the first conductor layer 262 in the overlay region 276 leads to substantial current shunting. For example, based on experimental results, the GMR read sensor 204 and the LB stack 224 exhibit a sheet resistance of 16 $\Omega/cm^2$, while those in the Ta first conductor layer exhibit a sheet resistance of 10 $\Omega/cm^2$. As a result, 52% of the sense current will be shunted into the first conductor layer 262. This shunted current induces a magnetic field strong enough to align $M_1$ in the two overlay regions 276 in a direction perpendicular to the ABS. The GMR read sensor in the two overlay regions 276 is thus inactive since $M_1$ cannot be rotated in response to signal fields. As a result, side reading is substantially eliminated and a read width is sharply defined by the boundary between the read 212 and overlay 276 regions.

The GMR read sensor 204 with the LB stack 208 and the first conductor layer 236 exhibits a GMR coefficient of as low as below 5%. However, when the first conductor layer 236 is completely removed in the read region 212 by RIE, the GMR read sensor with the LB stack 208 in the read region exhibits a GMR coefficient of as high as above 11%. More importantly, the GMR read sensor with the LB stack in the read region becomes active since $M_1$ is oriented in a direction parallel to the ABS by three counter-balancing fields, and can be rotated in response to signal fields. Hence, it is important to completely remove the first conductor layer in the read region 212 to ensure viable sensor operation. It is significant that although the bilayer photoresists are also used in this first GMR read head embodiment, they don't play any crucial role in defining the read width. Basically, the bilayer photoresist is just used for connecting the GMR read head with the second layer 280.

Figure 8:
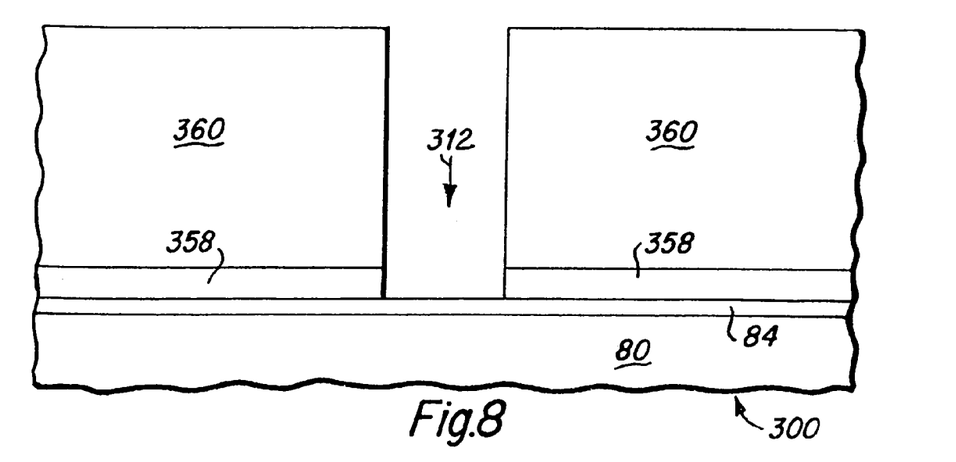
FIGS. 8–11 are side cross-sectional views of a second preferred embodiment of a read head portion of a magnetic head of the present invention.
Figure 9:
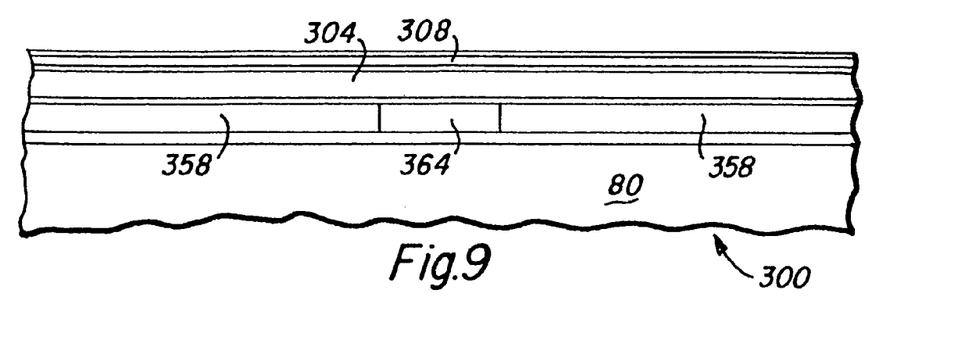
Figure 11:
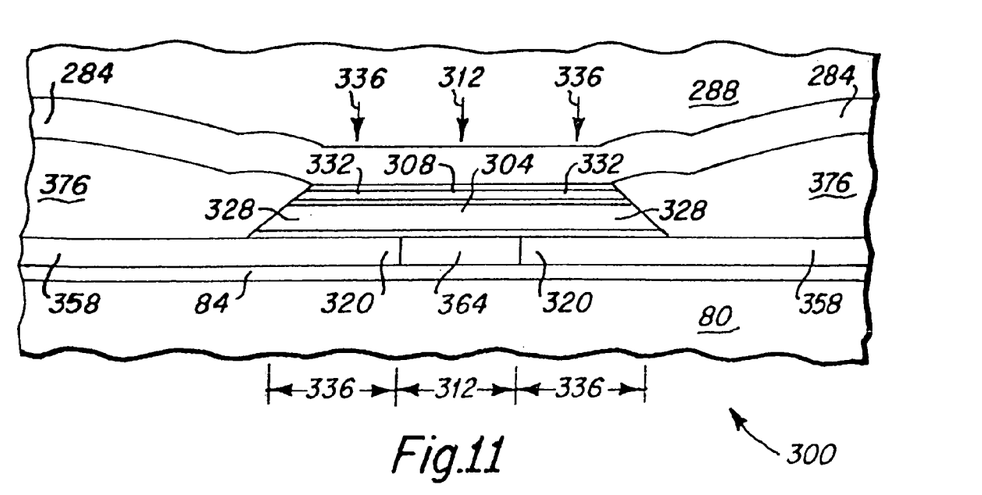

A second embodiment 300 of the present invention is depicted in FIGS. 8–11, and as is best seen in FIG. 11, it comprises a GMR read sensor 304 and a LB stack 308 in a read region 312, and the first conductor layer 320, outer portions 328 of the GMR read sensor, and outer portions 332 of the LB stack in two sideways displaced overlay regions 336. Particularly as depicted in FIG. 8, a first magnetic shield layer ($S_1$) 80 is fabricated upon a wafer substrate and the lower portion of the insulating bottom gap layer ($G_1$) 84 and a first conductor layer 358 comprising $TaN_x(3)/Ta(20)$ films are sequentially deposited on the $S_1$ shield layer 80. A monolayer photoresist 360 is then applied and developed in order to open a read region 312 for the definition of a read width. RIE is then performed to remove the first conductor layer in the read region 312, and the monolayer photoresist 360 is then removed, as shown in FIG. 9. the upper portion of the insulating bottom gap layer 364, formed of an $Al_2O_3$ film, is then applied and polished. A GMR read sensor 304, that may include NiCrFe(3)/NiFe(1)/PtMn(15)/CoFe(1.6)/Ru(0.8)/CoFe(1.8)/CuO(2.2)/CoFe(2)/Cu(0.6)/Ru(2.4) films, and an LB stack 308 that may include CoFe(3)/IrMn(6)/$Al_2O_3$(3) films, are sequentially deposited. After the depositions, the wafer is annealed in a magnetic field of 10 kOe perpendicular to the alignment mark for 5 hours at 265° C., and then annealed again in a magnetic field of 200 Oe parallel to the alignment mark for 1 hour at 240° C. The two anneals cause the PtMn films to pin the magnetizations of the CoFe/Ru/CoFe films in a direction perpendicular to the alignment mark, and cause the IrMn film to pin the magnetization of its underlying CoFe film in a direction parallel to the alignment mark.

Figure 10:
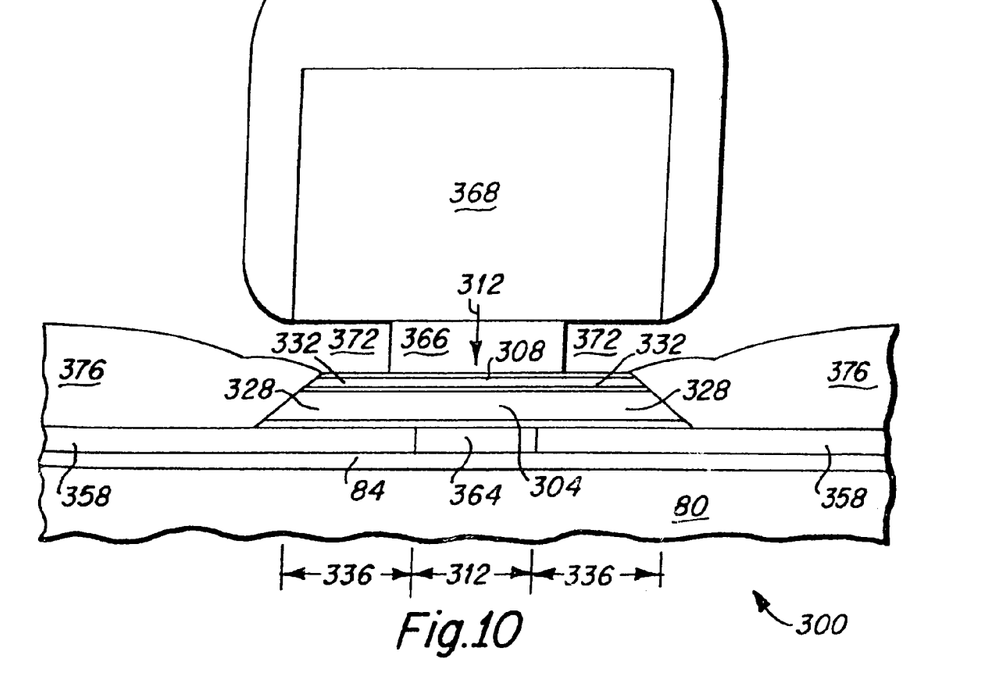

After these two anneals, bilayer photoresists 366 and 368 are applied, as shown in FIG. 10, and exposed in a photolithographic tool to mask the read and overlay regions, and then developed in a solvent to form an undercut 372. The multilayer films in the unmasked side region are removed by ion milling until the first conductor layer 358 is exposed, and a second conductor layer 376 that may include Ta(3)/Rh(80)/Ta(3) films is then deposited in the unmasked side regions. After this deposition, the bilayer photoresists are lifted off and the read head fabrication process continues as described above. After the completion of this read head fabrication process, the write head fabrication process starts. After the completion of the read/write head fabrication process, the sensor height is defined by lapping along the alignment mark. This second embodiment also possesses well defined read width and stability, and side writing is substantially eliminated.

While the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

What we claim is:

1. A magnetic head including a giant magnetoresistance (GMR) read head including a plurality of films, comprising:
    a GMR read sensor including a central read region and two outwardly disposed overlay regions;
    a longitudinal bias stack being disposed upon said central read region and upon said two outwardly disposed overlay regions of said GMR read sensor, said longitudinal bias stack including an upper planar surface; and
    an electrical conductor layer including two spaced apart electrical conductor portions, said electrical conductor portions being disposed above said longitudinal bias stack in said overlay regions, and wherein said electrical conductor portions each include an inner end face that is disposed upon said upper planar surface of said longitudinal bias stack and extends generally perpendicularly to said upper planar surface of said longitudinal bias stack.

2. A magnetic head as described in claim 1 wherein said electrical conductor layer includes a lower planar surface that is disposed upon said upper planar surface of said longitudinal bias stack.

3. A magnetic head including a GMR read head, comprising:
   a bottom magnetic shield layer being disposed above a slider substrate;
   a first electrically insulating layer being disposed upon said bottom magnetic shield layer;
   a GMR read sensor including a plurality of films being disposed upon said first electrically insulating layer, said GMR read sensor including a central read region and two outwardly disposed overlay regions, said GMR read sensor including a pinned magnetic layer and a free magnetic layer;
   a longitudinal bias stack being disposed upon said free magnetic layer and across said central read region and said overlay regions;
   an electrical conductor layer including two spaced apart electrical conductor portions being disposed in said overlay regions, each said electrical conductor portion including a lower planar surface that is disposed above said longitudinal bias stack in said overlay regions, and wherein each of said electrical conductor portions has an inwardly disposed face that is formed in a generally perpendicular orientation relative to said lower planar surface of said electrical conductor portions;
   a second electrically insulating layer being disposed upon said electrical conductor layer; and
   a top magnetic shield layer being disposed above said second electrically insulating layer.

4. A magnetic head as described in claim 3 wherein said lower planar surface of each of said electrical conductor portions is disposed upon said longitudinal bias stack.

5. A hard disk drive including a magnetic head that includes a GMR read head, comprising:
   a bottom magnetic shield layer;
   a bottom electrically insulating layer being disposed upon said bottom magnetic shield layer;
   a GMR read sensor including a plurality of films being disposed upon said bottom insulating layer, said GMR read sensor including a central read region and two outwardly disposed overlay regions, said GMR sensor including a pinned magnetic layer and a free magnetic layer;
   a longitudinal bias stack being disposed upon said free magnetic layer and across said central region and said overlay regions of said GMR read sensor, said longitudinal bias stack including an upper planar surface;
   an electrical conductor layer including two spaced apart electrical conductor portions being disposed in said overlay regions, and wherein each of said electrical conductor portions has an inwardly disposed face that is formed upon said upper planar surface of said longitudinal bias stack and extends in a generally perpendicular orientation relative to said upper planar surface of said longitudinal bias stack;
   a top electrically insulating layer being disposed upon said electrical conductor layer; and
   a top magnetic shield layer being disposed above said top electrically insulating layer.

6. A hard disk drive as described in claim 5 wherein said electrical conductor layer includes a lower planar surface that is disposed upon said longitudinal bias stack.

7. A magnetic head including a read head portion that is fabricated by a method comprising the steps of:
   fabricating a bottom magnetic shield layer;
   fabricating a bottom electrically insulating layer upon said bottom magnetic shield layer;
   fabricating a GMR read sensor including a plurality of films, said GMR read sensor including a central read region and two outwardly disposed overlay regions, said GMR read sensor including a pinned magnetic layer and a free magnetic layer;
   fabricating a longitudinal bias stack upon said free magnetic layer and across said central read region and said overlay regions of said GMR read sensor;
   fabricating an electrical conductor layer on said longitudinal bias stack;
   fabricating a monolayer photoresist mask upon said electrical conductor layer, said mask including a read width trench formed therethrough;
   reactive-ion-etching a read width trench within said electrical conductor layer to create two electrical conductor portions that are disposed in said overlay regions, wherein said two electrical conductor portions are formed with a planar lower surface that is disposed upon said longitudinal bias stack and opposing end faces that result from the reactive-ion-etching, wherein said end faces are generally perpendicular to said lower surface of said electrical conductor portions;
   fabricating a top electrically insulating layer above said electrical conductor layer; and
   fabricating a top magnetic shield layer upon said top electrically insulating layer.

8. A magnetic head, as described in claim 7, wherein the step of fabricating said GMR read sensor including said plurality of films is performed before the steps of fabricating said electrical conductor layer, fabricating said monolayer photoresist mask, and reactive-ion-etching said read width trench within said electrical conductor layer.

* * * * *